Figure 1:
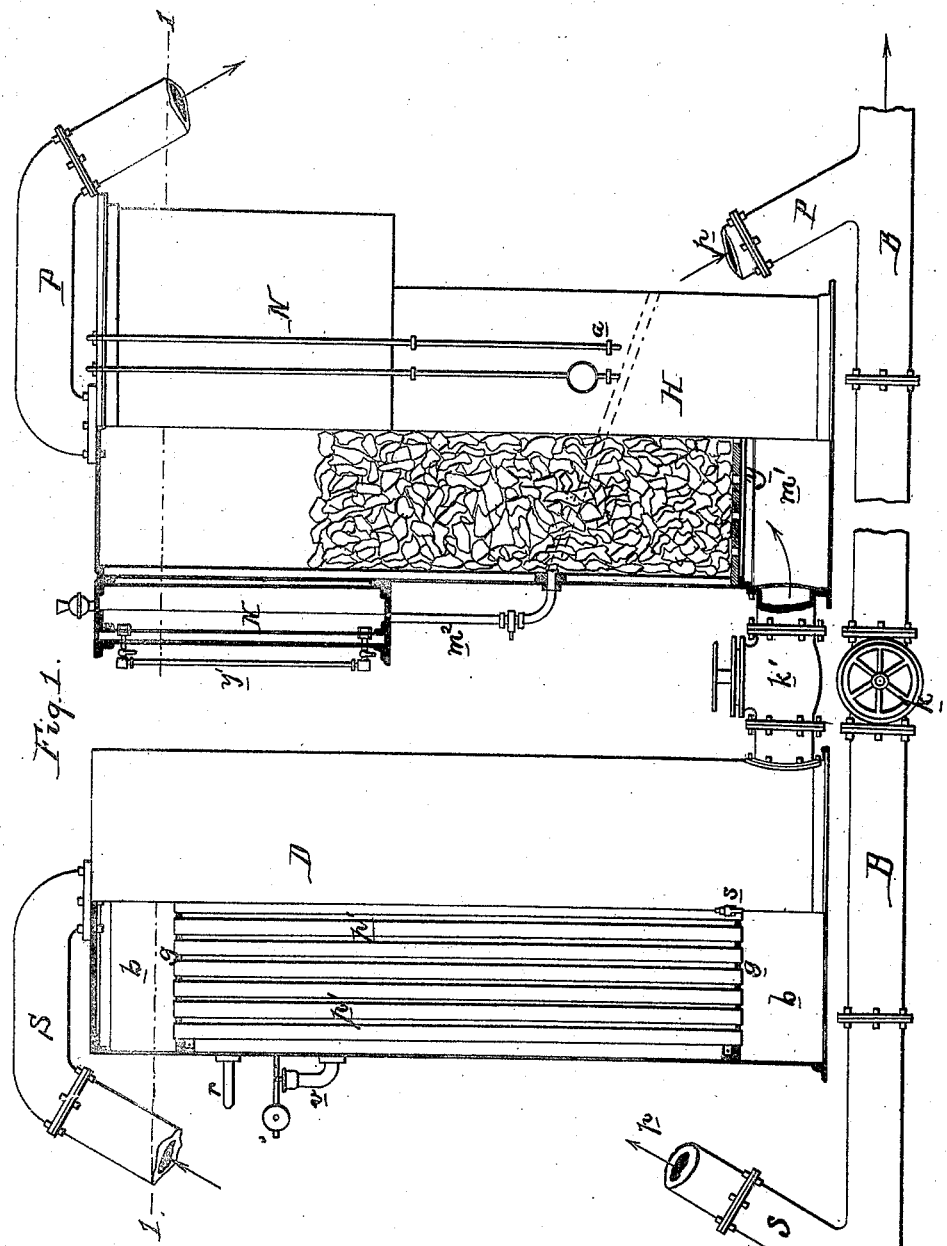

S. R. SMYTH & J. SIMPSON.
REFINING IRON AND STEEL.

No. 192,948. Patented July 10, 1877.

Witnesses
J. L. Skidmore
T. McCleary

Samuel R. Smyth
and Joseph Simpson
by his Attorney
Howson and

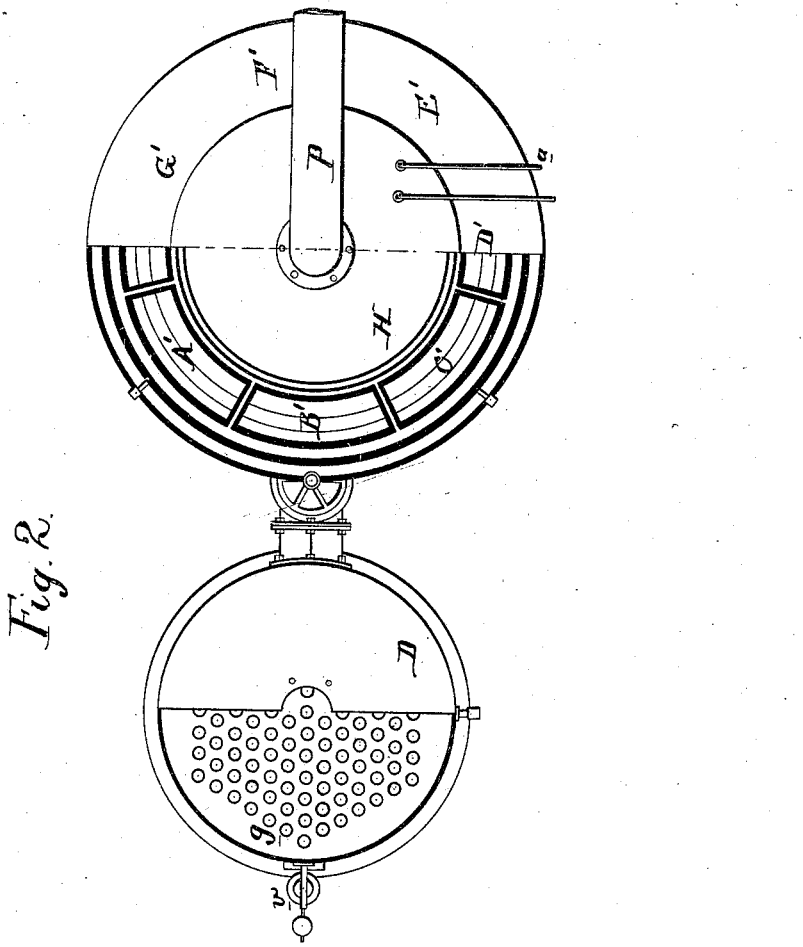

UNITED STATES PATENT OFFICE.

SAMUEL R. SMYTH AND JOSEPH SIMPSON, OF MANCHESTER, ENGLAND.

IMPROVEMENT IN REFINING IRON AND STEEL.

Specification forming part of Letters Patent No. 192,948, dated July 10, 1877; application filed July 27, 1875.

*To all whom it may concern:*

Be it known that we, SAMUEL RICHARD SMYTH and JOSEPH SIMPSON, both of Manchester, county of Lancaster, Kingdom of Great Britain and Ireland, have invented certain Improvements in and Apparatus for the Manufacture of Iron and Steel, of which the following is a specification, said invention being described in Letters Patent No. 3,840, granted to us November 7, 1874.

The object of our invention is to effect the purification and refining of iron and its conversion into steel cheaply, effectively, and expeditiously, which object we attain in a manner and by means of apparatus which we will now proceed to describe.

All iron ores contain impurities, varying in character and quantity, and the removal of these impurities, so as to produce refined iron, or the working of the iron so as to produce steel, by the present methods, demand lengthened and expensive manipulation.

In carrying out our invention the percentage of each impurity in the ore to be treated is first ascertained by spectrum analysis, or otherwise.

The percentage of each impurity having been determined, the character and quality of the chemical agent or agents necessary for effecting the removal of these impurities can be readily ascertained, and said agents as readily applied by means of our invention.

The ore is first smelted in a furnace, and into the molten mass the chemical agents, in the condition of vapor or gas, are forced under pressure. The chemical agents used are properly proportioned to effect the desired purification, refinement, or conversion of the iron, and our mode of conveying these agencies into the metal is by means of a blast of air impregnated with them in vaporous or gaseous form.

The introduction of the compounds, either together or singly, as well as the order of their introduction, must be governed by the character of the ore or metal under treatment.

If, after the metal passes from the first operation, it is still found to contain any impurities, or is otherwise below the desired standard of purity, it may be subjected to the further action of the proper agent or agents in the after manipulations of the metal.

It will be evident that by the above described method of forcing into a mass of molten iron or iron ore chemical agents in a vaporized or gaseous form, and under pressure, the impurities in the iron will thereby be evolved by means of the action of the compounds, both rapidly and thoroughly.

In the accompanying drawings, which represent our apparatus, Figure 1, Sheet 1, is a side view, partly in section, of the apparatus; and Fig. 2, Sheet 2, is a plan view, partly in section, on the line 1 1, Fig. 1.

B represents the ordinary blast-pipe, leading from the blast-engine to the bed of molten metal in a melting, refining, or other furnace, or in a Bessemer converter, the said pipe being provided with a valve, $k$, by which the direct blast can be cut off. S is a branch, provided with a valve, $p$, and leading from the blast-pipe B to the top of the casing D of the heater, the lower end of which communicates with the lower end of a generator, H, through a valve-inlet, $k'$. The top of the generator H communicates with a branch pipe, P, which is connected to the blast-pipe B, and is provided with a suitable valve, $p$.

The air-heater D, preferably of a cylindrical form, is made of wrought-iron plates, properly riveted together and to angle-irons. At some distance from each end of the vessel are secured tube-sheets $g$ $g$, provided with the tubes $p'$ $p'$, air spaces or chambers $b$ $b$ being thus formed at the top and bottom of the heater.

The steam-space between the tube-sheets is supplied with steam through the valved tube $r$, the heater being provided with a safety-valve and pressure-gage, $v$, and blow-off valve $s$. The generator H is also made of iron, with a steam-jacket, as shown, and near the lower end is a perforated grating, $y$, forming a chamber, $m^1$ corresponding to a chamber, $b$, formed in the lower end of the heater.

Around the upper end of the casing of the generator H is arranged a cylinder, N, separated into a series of chambers, $A'$ $B'$ $C'$ $D'$ $E'$ $F'$ $G'$. Each chamber is provided with a registering gage, pressure-gage, thermometer, and a burner, $a$.

The inside of the generator H may be lined with cement, asphalt, and pitch, and on the grating $y$ is placed a quantity of loose chalk, charcoal, scoria, or coke, as shown.

Each chamber communicates with the interior of the generator H through a pipe, $m^2$, and its perforated continuation, (shown by dotted lines in Fig. 1,) and each chamber contains a chemical agent or compound of a character demanded in the treatment of the iron ore or molten iron of any known character. Thus, the chamber A' may contain petroleum of a quality represented by the symbol $C_{10}H_8$, while the chamber B' contains wood naphtha of a quality represented by the symbol $C_{14}H_{10}$. The chamber C' contains hydrochloric acid and naphtha, $(HCl+C_{14}H_{10};)$ the chamber D' contains chlorine and coal-tar gas; the chamber E' contains a solution of nitrate of soda and lime, $(Na,No_3+CaO,)$ condensed to its greatest density; the chamber F' contains a condensed solution of caustic potash, caustic soda, and lime, $(HKO+NaHO+CaO,)$ and the chamber G' contains hydrofluoric acid, $(HF.)$ These compounds may be generated into gases in their compartments before being admitted to the interior of the generator H, or they may be admitted to the generator in their liquid form through the perforated pipes $m^2$ when their respective valves are opened.

The valve $k$ being closed, and the valves $p\ p$ opened, the blast of air from the pipe B will pass through the heater D, and thence will pass, in a heated condition, into the chamber $m^1$ of the generator, and through the coke or other material in the generator, where it will become impregnated with the chemical agent or agents, either liquid or gaseous, which have been allowed to pass from one or more of the chambers A' B' C', &c. The impregnated blast will then be carried through the branch P and pipe B to the furnace or Bessemer converter, there passing into and through the molten mass, and purifying, refining, or converting it by separating or evolving the objectionable elements therein.

Instead of separating one casing into a number of chambers, A' B' C', &c., as described, separate chambers may be employed, if desired.

We claim as our invention—

1. The process herein described of purifying and refining iron—that is to say, by first passing a blast of air through a mass of coke or other granulated material saturated with purifying chemical agents, and then forcing the impregnated blast into the metal in the furnace, substantially as specified.

2. The combination of the generator H, containing coke or other granulated material, a series of tanks, A' B' C', &c., each provided with a pipe for conveying the contents of the tanks into the generator, with pipes S P, for conveying the blast of air to, and discharging it in a saturated condition from, the said generator, all substantially as set forth.

In testimony whereof we have signed our names to this specification in the presence of two subscribing witnesses.

SAMUEL RICHARD SMYTH.
JOSEPH SIMPSON.

Witnesses:
JAS. C. WOLFENDEN,
THOMAS PRICE.